United States Patent [19]

Schledorn

[11] Patent Number: 4,803,114

[45] Date of Patent: Feb. 7, 1989

[54] PVC FILM FOR THE PRODUCTION OF IDENTITY CARDS

[75] Inventor: Martin Schledorn, Kirchehrenbach, Fed. Rep. of Germany

[73] Assignee: Internationale Octrooimaatschappij "Octropa" B.V., Rotterdam, Netherlands

[21] Appl. No.: 942,083

[22] Filed: Dec. 15, 1986

[30] Foreign Application Priority Data

Dec. 14, 1985 [DE] Fed. Rep. of Germany ....... 3544385

[51] Int. Cl.$^4$ .......................... B32B 5/16; B32B 9/00; C08K 3/04
[52] U.S. Cl. .................................... 428/208; 428/323; 428/408; 428/514; 428/518; 428/463; 428/522; 428/916; 524/496; 524/567
[58] Field of Search ............... 428/408, 323, 207, 208, 428/916, 578, 522; 524/80, 424, 567, 496

[56] References Cited

U.S. PATENT DOCUMENTS

| | | | |
|---|---|---|---|
| 3,551,379 | 12/1970 | Dany et al. | 524/80 |
| 3,930,924 | 1/1976 | Oka et al. | 427/7 X |
| 4,097,279 | 6/1978 | Whitehead | 427/145 X |
| 4,507,346 | 3/1985 | Maurer et al. | 428/913 X |
| 4,556,589 | 12/1985 | Neumann et al. | 428/522 |

Primary Examiner—P. C. Ives
Attorney, Agent, or Firm—Cushman, Darby & Cushman

[57] ABSTRACT

The PVC film contains a very small percentage of carbon black, which makes it possible to mark the film excellently by means of a laser beam.

3 Claims, 1 Drawing Sheet

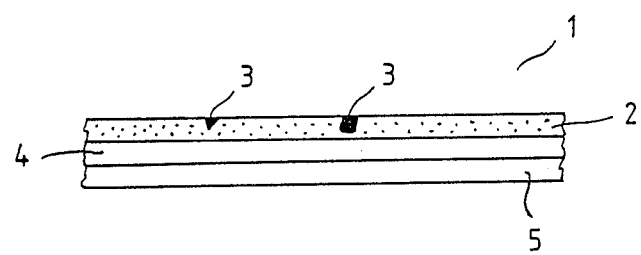

PVC FILM FOR THE PRODUCTION OF IDENTITY CARDS

BACKGROUND OF THE INVENTION

The invention relates to a PVC film for the production of identity cards or similar products which can be inscribed or marked with the help of a laser beam.

EP-OS 01 38 121 discloses a compound based on vinyl chloride polymers for the production of films used to make forgery-proof securities. This compound contains not only 5 to 20% impact resistance modification agent but also 0.5 to 25% pure cellulose in pulverized form.

There are, however, disadvantages to this for identity cards in particular, as the cellulose greatly increases the water absorption capacity of the card. If such a card is exposed to moisture or water, it becomes cloudy and can no longer be read.

SUMMARY OF THE INVENTION

The purpose of the present invention was to develop a PVC film of the type outlined above in such a way that it can be inscribed or marked fully satisfactorily by a laser beam without having the disadvantages of the film disclosed previously.

The way the present invention achieves this objective is to add 0.1 to 20 g of carbon black to each 100 kg of PVC powder. It has proved a particularly effective solution to add 0.6 g of carbon black to each 100 kg of PVC powder.

Such a PVC film can be inscribed excellently by a laser beam. It is even possible to produce relatively well defined pictures with this film. The film is nevertheless transparent and retains its original good properties.

An identity card produced according to the present invention has the PVC film with carbon black content as its top layer, which is backed with a largely non-transparent layer.

When a card is produced in this way, the required information is only applied to the transparent top layer with the help of the laser beam. The non-transparent second layer provides sufficient contrast.

BRIEF DESCRIPTION OF THE DRAWING

The drawing shows one embodiment of the invention. It represents a cross section of an identity card.

DETAILED DESCRIPTION OF THE INVENTION

The identity card 1 consists of three layers, the top layer being a PVC film 2 which contains 0.6 g of carbon black per 100 kg of PVC powder. 3 are marks made in this film with the help of a laser beam. This PVC film 2 is backed by a middle layer 4 which is made from white PVC. The bottom layer consists of a further transparent film 5.

It would, however, also be possible to use paper or metal foil for the middle layer.

I claim:

1. An identity card capable of being inscribed or marked with a laser beam which comprises a transparent top layer of polyvinyl chloride film containing 0.1 to 20 g of carbon black per 100 kg of polyvinyl chloride supported by an essentially nontransparent backing layer.

2. A card according to claim 1 wherein the polyvinyl chloride film includes 0.6 g of carbon black per 100 kg of polyvinyl chloride in the film.

3. An identity card according to claim 1 including laser inscriptions or markings on said polyvinyl chloride film.

* * * * *